United States Patent Office 3,321,670
Patented May 23, 1967

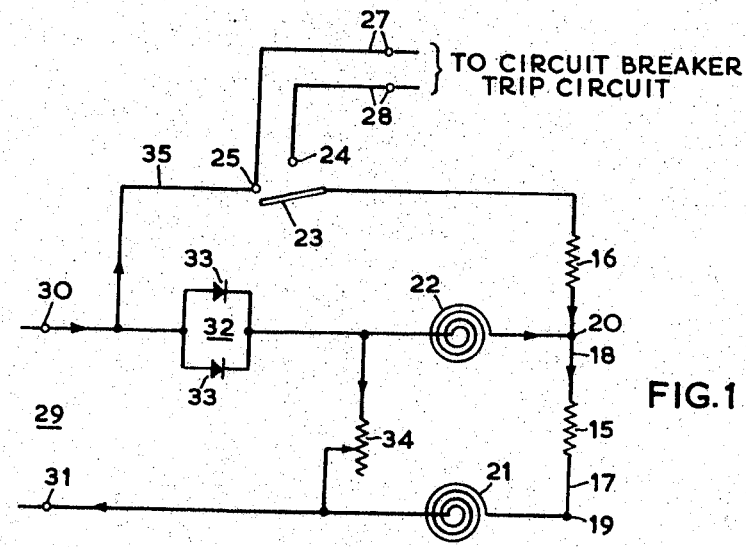
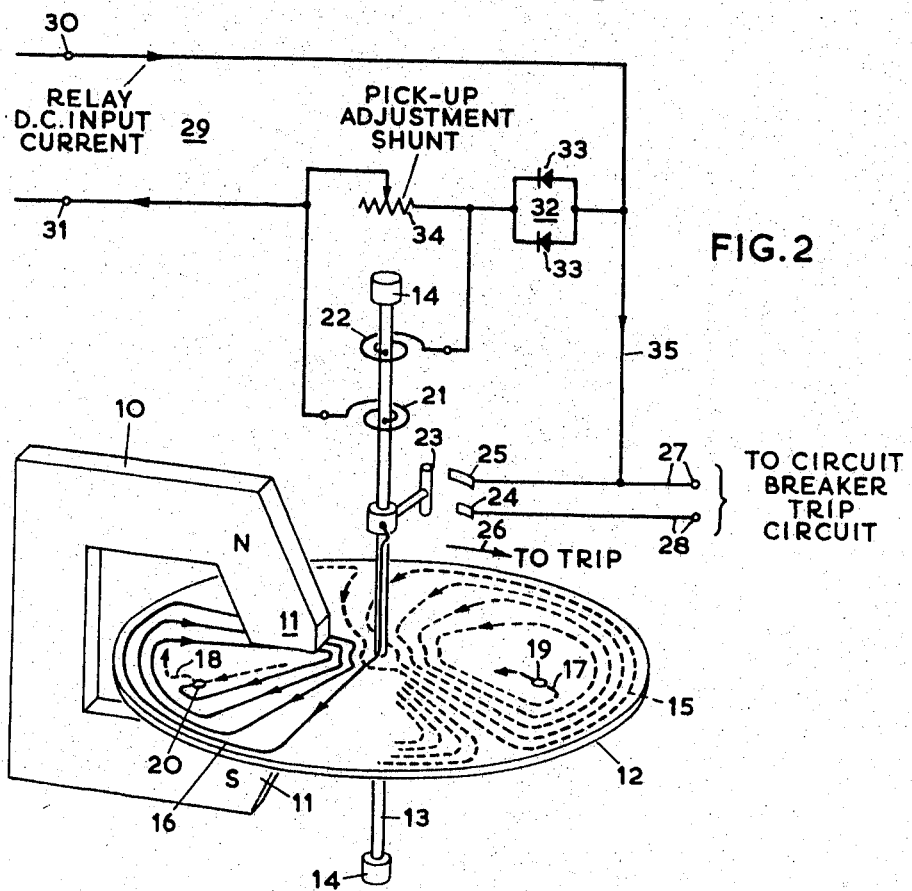

3,321,670
ELECTRICAL PROTECTIVE RELAYS
Peter Lewis Moreton, Felton, Somerset, England, assignor to The English Electric Company Limited, London, England, a British company
Filed Sept. 6, 1963, Ser. No. 307,149
Claims priority, application Great Britain, Sept. 11, 1962, 34,734/62
3 Claims. (Cl. 317—58)

This invention relates to an electrical protective relay, that is to say to an electrical relay which in response to an input electric current signals indicative of a fault condition in an electrical circuit to be protected by the relay is operative to actuate electrical contact means connected in a control circuit whereby to initiate an automatic de-energisation or disconnection of the said circuit to be protected.

Some fault conditions give rise to such input electric current signals of high magnitude, whilst others give rise to such signals of relative low magnitude. The protective relay should in response to input signals of both such high magnitude and such low magnitude cause a definite and unhesitating actuation of the said electrical contact means.

The present invention is directed to the provision of an electrical protective relay in which such actuation of the said electrical contact means is possible.

According to the present invention an electircal protective relay includes a magnetic flux producing means having poles producing in an air gap between them a magnetic flux, a rotor mounted for rotation with a part thereof extending into the air gap between the poles, a first electrical winding carried by the rotor for cooperation with the magnetic flux in the air gap and for exerting on the rotor when energised by a uni-directional relay input current an electro-magnetic torque tending to rotate the rotor from a non-operative position to an operative position, a second electrical winding carried by the rotor for co-operation with the magnetic flux in the air gap and for exerting on the rotor when energized by part of the relay input current an electro-magnetic torque for increasing the torque tending to rotate the rotor to the operative position, a relay input electric circuit for receiving the uni-directional relay input current, this circuit including in series with one another the said first electrical winding and a non-linear resistance device which exhibits at low current values a relatively high resistance value, and at progressively increasing current values progressively decreasing resistance values, first electrical contact means for connection in a control circuit to be controlled by the relay, this contact means being operated by the rotor from a first state to a second state only when the rotor moves into the said operative position, and second electrical contact means operated from a first state to a second state by the rotor when the rotor moves into a predetermined range of positions adjacent to and including the said operative position, this contact means when in the said second state connecting the said second electrical winding electrically in parallel with the said non-linear resistance device.

Preferably, the second electrical winding is positioned on the rotor so as to co-operate with the magnetic flux in the air gap only when the rotor lies within the said predetermined range of positions.

One electrical protective relay embodying the present invention will now be described by way of example and with reference to the accompanying drawing, in which FIGURE 1 shows a diagram of the electric circuit arrangement of the relay, and FIGURE 2 shows diagrammatically in perspective view the physical arrangement of the relay together with the associated electric circuits.

Referring now to the drawing the relay includes a magnet 10 whose poles 11 define between them an air gap, and a disc-shaped rotor 12 mounted on a central shaft 13 which is supported in bearings 14 for rotation with part of the rotor extending through the air gap between the magnet poles.

The rotor comprises an insulating disc member carrying within it printed circuit windings 15, 16. For the sake of clarity and simplicity the winding 15 (referred to hereafter as the "driving winding") is indicated by dotted lines, whilst the winding 16 (referred to hereafter as the "seal-in winding") is indicated by full lines. The driving winding comprises a winding ararngement such as has been fully disclosed in the United States Patent No. 3,252,053, issued to the assignee in respect of the present application, and consequently to avoid confusion in the FIGURE 2 this driving winding has been shown in part only.

The ends 17, 18 of the driving winding are electrically connected at 19, 20, with internal leads which connect by means not shown with control springs 21, 22 respectively.

The seal-in winding connects at one end with the end 18 of the driving winding, and at its other end with a contact blade 23 which is mounted on, but electrically insulated from, the rotor shaft 13. This contact blade is arranged to co-operate with two fixed contact members 24, 25.

The contact member 24 is disposed at a predetermined position such that when the rotor has been driven to an "operative" position at the end of its normal travel in a clockwise (or "TRIP") direction (as indicated by the arrow 26) the contact blade 23 makes electrical contact therewith.

The fixed contact member 25 is similar to the fixed contact 24, but extends over a greater arc of a circle so that as the rotor rotates towards the operative position the moving contact blade 23 makes electrical contact first with the fixed contact 25, and then later and in addition with the second fixed contact 24. Thus, whilst fixed contact 24 makes contact with the contact blade 23 only when the rotor is at the operative position, the fixed contact 25 makes contact with the contact blade when the rotor lies in a predetermined range of positions immediately adjacent to and including the operative position.

The fixed contact members 24, 25, have electrical circuit connections and terminals 27, 28 associated therewith for enabling those contact members to be connected in a control circuit for a high energy tripping coil of a circuit breaker (not shown).

The relay has an electrical input circuit 29 which extends between input terminals 30, 31, and which in operation is supplied (through a current transformer and rectifier) with a direct current proportional to a current flowing in an electrical circuit to be protected by the relay.

The relay input circuit includes in series between the input terminals a non-linear resistance device 32, constituted by a pair of similar diodes 33 connected in parallel with one another, and the driving winding 15 of the rotor, connection to this winding being made by way of the control springs 21, 22.

An adjustable resistor 34 is connected electrically in parallel with the driving winding 15, and serves to provide means for adjusting the proportion of the relay input circuit current which flows in the driving winding 15. This resistor 34 hence provides a means of adjusting the "pick-up value" of relay input circuit current at which the rotor is just caused to rotate in the tripping direction from the non-operative or quiescent position.

A circuit connection 35 connects the fixed contact member 25 with the positive terminal 30 of the relay input circuit, thus providing when the contact blade 23 contacts the fixed contact member 25 a circuit in parallel with the non-linear resistance device 32. This parallel circuit includes the seal-in winding 16.

In FIGURE 2 the relay is shown with the driving winding energised as a result of the flow of a relay input circuit current greater than the pick-up value, and with the rotor close to the operative position after rotation through a substantial part of a revolution in the TRIP direction from the non-operative position.

In operation, when the input circuit current rises to a value above the pick-up value the rotor is subjected to a driving torque sufficient to rotate it in the TRIP direction. The speed of rotation is dependent on the magnitude of the relay input circuit current, and the higher this magnitude, the greater the torque applied to the rotor, the greater the rotor speed, and the shorter the time taken to rotate the rotor to the operative position.

It will be observed that until the contact blade 23 makes contact with the fixed contact 25, the driving winding 15 is the sole provider of rotor driving torque, this torque being produced by virtue of the electro-magnetic interaction of the current in those parts of the driving winding which lie within the magnet air gap with the magnetic flux in the air gap.

Thus when approaching the operative position continued movement of the rotor 12 causes the contact blade 23 to make electrical contact first with the longer fixed contact member 25, and then if rotation of the rotor continues with the shorter fixed contact member 24. Contact between the contact blade 23 and the longer fixed contact member 25 results in the energisation of the seal-in winding 16 by a current due to the potential drop then appearing across the non-linear resistance device 32. This current in the seal-in winding interacts with the magnetic flux in the magnet air gap to provide an additional torque acting to drive the rotor in the TRIP direction, so that the rotor is consequently driven firmly and unhesitatingly into the operative position, thus causing the contact blade 23 to bridge the fixed contact members 24 and 25 and thereby complete the tripping coil circuit of the circuit breaker.

It will be observed that the seal-in winding extends over a small sector only of the rotor, and that this winding is positioned in relation to the rotor so that some of its conductors lie in the magnetic flux in the magnet air gap only when the rotor lies in the operative position and in a small range of positions immediately adjacent to the operative position, this range of positions corresponding to the range of rotor positions providing contact between the contact blade 23 and the longer fixed contact 25.

The diodes 33 of the non-linear resistance device 32 are arranged to work over the non-linear range on their voltage/current characteristic, and this characteristic is selected such that (a) when the relay input circuit current lies just above the pick-up value the diodes exhibit a high resistance value such that a large proportion of that current is caused to flow in the seal-in winding when connected, and (b) when the relay input circuit current lies well above the pick-up value the diodes exhibit a relatively small resistance value such that a much smaller proportion of the relay input circuit current is caused to flow in the seal-in winding when connected.

It will therefore be appreciated that the energisation of the seal-in winding is automatically varied in dependence upon the magnitude of the relay input circuit current and in a manner such that a low rotor torque due to a low relay input circuit current is augmented by a relatively large rotor torque due to the seal-in winding, and such that a high rotor torque due to a high relay input circuit current is augmented by a relative low rotor torque due to the seal-in winding.

Because of this arrangement for ensuring good operation of the contact blade 23, the electrical duty of the contacts 23 to 25 can be appropriately large to suit the high energy tripping coils now used in present-day circuit breakers.

This relay arrangement also provides an advantageous "seal-in" effect which is dependent solely on the energisation provided by the relay input circuit current. Hence no external supply source is necessary for effecting the desired "seal-in" action. Furthermore, since the seal-in action is dependent on the existence of an appropriately large relay input circuit current, the cessation of such current due to the automatic clearance of a fault on the electrical circuit protected by the relay after the seal-in winding has become energised but before the contact blade 23 has made contact with the shorter fixed contact member 24 to complete the tripping circuit results in the stopping of the rotor and the prevention of the initiation of an unnecessary tripping of the associated circuit breaker. Thus an unnecessary and perhaps costly interruption of the electrical supply to many consumers is avoided.

What I claim as my invention and desire to secure by Letters Patent is:

1. An electrical protective relay including a magnetic flux producing means having poles producing in an air gap between them a magnetic flux, a rotor mounted for rotation with a part thereof extending into the air gap between the poles, a first electrical winding carried by the rotor for co-operation with the magnetic flux in the air gap and for exerting on the rotor when energized by a uni-directional relay input current an electro-magnetic torque tending to rotate the rotor from a non-operative position to an operative position, a second electrical winding carried by the rotor for co-operation with the magnetic flux in the air gap and for exerting on the rotor when energised by part of the relay input current an electro-magnetic torque for increasing the torque tending to rotate the rotor to the operative position, a relay input electric circuit for receiving the uni-directional relay input current, this circuit including in series with one another the said first electrical winding and a non-linear resistance device which exhibits at low current values a relatively high resistance value, and at progressively increasing current values progressively decreasing resistance values, first electrical contact means for connection in a control circuit to be controlled by the relay, this contact means being operated by the rotor from a first state to a second state only when the rotor moves into the said operative position, and second electrical contact means operated from a first state to a second state by the rotor when the rotor moves into a predetermined range of positions adjacent to and including the said operative position, this contact means when in the said second state connecting the said second electrical winding electrically in parallel with the said non-linear resistance device.

2. An electrical protective relay according to claim 1, wherein the second electrical winding is positioned on the rotor so as to co-operated with the magnetic flux in the air gap only when the rotor lies within the said predetermined range of positions.

3. An electrical protective relay according to claim 2, wherein one end of the said second electrical winding is connected to the relay input circuit at the junction of one end of the non-linear resistance device and the said first electrical winding, and the said first electrical contact means comprises first and second fixed contact members and a movable contact member carried by the rotor and arranged to bridge the first and second fixed contact members when the rotor lies in the operative position, and wherein the said second electrical contact means is constituted by the said movable contact member, the said first fixed contact member, the said first fixed contact member being of length such as to be contacted by the movable member when the rotor lies in the said predetermined range of positions, means connecting the movable contact member with the other end of the said second electrical winding, and means connecting the said first fixed contact member with the other end of the non-linear resistance device.

References Cited by the Examiner

UNITED STATES PATENTS 2,042,109  5/1936  Lamb _____ 317—152 X

MILTON O. HIRSHFIELD, *Primary Examiner.*

R. V. LUPO, *Assistant Examiner.*